United States Patent
Zhang et al.

(10) Patent No.: US 11,861,919 B2
(45) Date of Patent: Jan. 2, 2024

(54) TEXT RECOGNITION METHOD AND DEVICE, AND ELECTRONIC DEVICE

(71) Applicant: Beijing Baidu Netcom Science and Technology Co., Ltd., Beijing (CN)

(72) Inventors: Chengquan Zhang, Beijing (CN); Pengyuan Lv, Beijing (CN); Kun Yao, Beijing (CN); Junyu Han, Beijing (CN); Jingtuo Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 205 days.

(21) Appl. No.: 17/352,668

(22) Filed: Jun. 21, 2021

(65) Prior Publication Data

US 2021/0357710 A1  Nov. 18, 2021

(30) Foreign Application Priority Data

Dec. 17, 2020  (CN) .......................... 202011495211.9

(51) Int. Cl.
| | |
|---|---|
| *G06V 20/00* | (2022.01) |
| *G06V 20/62* | (2022.01) |
| *G06N 3/08* | (2023.01) |
| *G06V 30/262* | (2022.01) |
| *G06V 20/58* | (2022.01) |

(Continued)

(52) U.S. Cl.
CPC .............. *G06V 20/62* (2022.01); *G06N 3/045* (2023.01); *G06N 3/08* (2013.01); *G06V 20/582* (2022.01); *G06V 20/63* (2022.01); *G06V 30/153* (2022.01); *G06V 30/262* (2022.01);

(Continued)

(58) Field of Classification Search
CPC ...... G06V 20/62; G06V 20/582; G06V 20/63; G06V 30/153; G06V 30/262; G06V 30/274; G06V 30/10; G06V 30/287; G06V 30/293; G06N 3/045; G06N 3/08
See application file for complete search history.

(56) References Cited

FOREIGN PATENT DOCUMENTS

| | | |
|---|---|---|
| CN | 106845474 A | 6/2017 |
| CN | 109934229 A * | 6/2019 |

(Continued)

OTHER PUBLICATIONS

Gao et al, Multi-Modal Graph Neural Network for Joint Reasoning on Vision and Scene Text, arXiv:2003.13962v1, Mar. 31 (Year: 2020).*

(Continued)

*Primary Examiner* — Ping Y Hsieh
*Assistant Examiner* — Xiao Liu
(74) *Attorney, Agent, or Firm* — Quinn IP Law (57) ABSTRACT

A text recognition method includes: acquiring an image including text information, the text information including M characters, M being a positive integer greater than 1; performing text recognition on the image to acquire character information about the M characters; recognizing reading direction information about each character in accordance with the character information about the M characters, the reading direction information being used to indicate a next character corresponding to a current character in a semantic reading order; and ranking the M characters in accordance with the reading direction information about the M characters to acquire a text recognition result of the text information.

14 Claims, 2 Drawing Sheets

(51) Int. Cl.
  *G06V 30/148* (2022.01)
  *G06N 3/045* (2023.01)
  *G06V 30/28* (2022.01)
  *G06V 30/10* (2022.01)

(52) U.S. Cl.
  CPC ............ *G06V 30/274* (2022.01); *G06V 30/10* (2022.01); *G06V 30/287* (2022.01); *G06V 30/293* (2022.01)

(56) References Cited

FOREIGN PATENT DOCUMENTS

| CN | 109934229 A | | 6/2019 | |
|---|---|---|---|---|
| CN | 110659640 A | | 1/2020 | |
| CN | 110717366 A | * | 1/2020 | |
| CN | 111027563 A | * | 4/2020 | ........... G06K 9/3233 |
| CN | 111723789 A | | 9/2020 | |

OTHER PUBLICATIONS

Tian et al, Text flow: A unified text detection system in natural scene image, ICCV, pp. 4651-4659 (Year: 2015).*
Hu et al, WordSup: exploiting word annotations for character based text detection, ICCV, pp. 4940-4949 (Year: 2017).*
The extended European search report for European application No. EP21180501, dated Nov. 24, 2021.
Han Hu et al, "WordSup: Exploiting Word Annotations for Character based Text Detection", arxiv.org, Cornell University Library, 201 Olin Library Cornell University Ithaca, NY14853, Aug. 22, 2017.
Vo Quang Nhat et al"Text line 1-15 segmentation using a fully convolutional network in handwritten document images", IET Image Processing, IET, UK, vol. 12, No. 3, Mar. 1, 2018, pp. 438-446, ISSN: 1751-9659.

* cited by examiner

TEXT RECOGNITION METHOD AND DEVICE, AND ELECTRONIC DEVICE

CROSS-REFERENCE TO RELATED APPLICATION

This application claims a priority to Chinese Patent Application No. 202011495211.9 filed on Dec. 17, 2020, the disclosure of which is incorporated in its entirety by reference herein.

TECHNICAL FIELD

The present disclosure relates to the field of artificial intelligence, in particular to the field of computer vision technology and deep learning technology, more particularly to a text recognition method, a text recognition device and an electronic device.

BACKGROUND

Along with the rapid development of artificial intelligence, an Optical Character Recognition (OCR) technology has been widely applied in an image processing field.

Currently, in the OCR technology, modeling is usually performed in a mode of reading characters in a single direction, and a default reading mode usually includes reading the characters from left to right or from top to down, so it is merely able to recognize a text in conformity with a relative rule in an image.

SUMMARY

In a first aspect, the present disclosure provides in some embodiments a text recognition method, including: acquiring an image including text information, the text information including M characters, M being a positive integer greater than 1; performing text recognition on the image to acquire character information about the M characters; recognizing reading direction information about each character in accordance with the character information about the M characters, the reading direction information being used to indicate a next character corresponding to a current character in a semantic reading order; and ranking the M characters in accordance with the reading direction information about the M characters to acquire a text recognition result of the text information.

In a second aspect, the present disclosure provides in some embodiments a text recognition device, including: an acquisition module configured to acquire an image including text information, the text information including M characters, M being a positive integer greater than 1; a text recognition module configured to perform text recognition on the image to acquire character information about the M characters; a reading direction recognition module configured to recognize reading direction information about each character in accordance with the character information about the M characters, the reading direction information being used to indicate a next character corresponding to a current character in a semantic reading order; and a ranking module configured to rank the M characters in accordance with the reading direction information about the M characters to acquire a text recognition result of the text information.

In a third aspect, the present disclosure provides in some embodiments an electronic device, including at least one processor and a memory in communication with the at least one processor. The memory is configured to store therein an instruction executed by the at least one processor, and the at least one processor is configured to execute the instruction so as to implement the text recognition method in the first aspect.

In a fourth aspect, the present disclosure provides in some embodiments a non-transitory computer-readable storage medium storing therein a computer instruction. The computer instruction is executed by a computer so as to implement the text recognition method in the first aspect.

In a fifth aspect, the present disclosure provides in some embodiments a computer program product. The computer program product is operated on an electronic device so as to implement the text recognition method in the first aspect.

It should be understood that, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

First Embodiment

Figure 1:
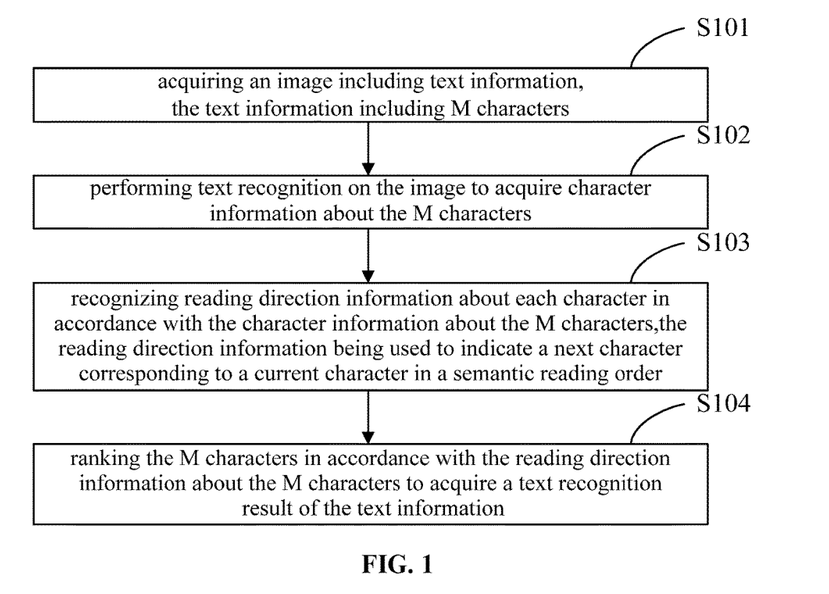
FIG. 1 is a flow chart of a text recognition method according to a first embodiment of the present disclosure.

As shown in FIG. 1, the present disclosure provides in this embodiment a text recognition method, which includes the following steps.

Step S101: acquiring an image including text information, the text information including M characters, M being a positive integer greater 1.

In this embodiment of the present disclosure, the text recognition method relates to the field of artificial intelligence, in particular to a computer vision technology and a deep learning technology, and it may be applied to an electronic device. The electronic device may be a server or a terminal, which will not be particularly defined herein.

The image may be an image including the text information, i.e., it may also be called as text image. The text information may include at least two characters. The image may be a block image, i.e., it may include at least one image blocks, and each image block may include at least one character.

The M characters may be all or a part of characters in the text information in the image, e.g., the M characters may be characters in one or more image blocks of the image, which will not be particularly defined herein.

The image may be an image collected in real time, or a pre-stored image, or an image from the other device, or an image acquired from a network.

For example, the image including the text information may be collected by a mobile phone or a computer in real time, e.g., an image of a shop sign, an image of a shop in a mall or an image of a traffic sign; or the image taken previously and including the text information may be stored in a device; or the image including the text information may be received from the other device or acquired from the network.

Step S102: performing text recognition on the image to acquire character information about the M characters.

In this step, a purpose of performing the text recognition on the image is to position and recognize the characters in the image, so as to acquire the character information about the M characters in the image.

The character information about each character may include character position information and character category information about the character, and the character position information is used to represent a position of the character in the image. The position of the character in the image may be represented through a position of a center of the character and geometrical information about the character jointly. The geometrical information about the character refers to information about a bounding box (i.e., an enclosure) for the character. The bounding box for the character refers to a region surrounding the character, and it may be of a square shape, a rectangular shape or any other shapes. When the bounding box for the character is of a rectangular shape, the geometrical information about the character may include values of a width and a length of the bounding box for the character.

The character category information about the character may represent a category of the character, and different characters may have different categories. In this way, it is able to determine the character in accordance with the character category information about the character. For example, character category information about one Chinese character may represent that the Chinese character is "过" (meaning "crossing"), and character category information about another Chinese character may represent that the Chinese character is "桥" (meaning a bridge).

The text recognition may be performed on the image using a character positioning and recognition module, and the character positioning and recognition module may be implemented in various ways. For example, the text recognition may be performed on the image through an existing or new target detection method, e.g., You Only Look Once (YOLO), Single Short multibox Detector (SSD), or faster Region-Convolutional Neural Network (R-CNN).

For another example, the text recognition may be performed on the image through Fully Convolutional Networks (FCN). The following description will be given when the text recognition is performed on the image using the FCN.

To be specific, pretreatment may be performed on the image to acquire an image with a predetermined size, and then the acquired image may be inputted into the FCN. The predetermined size may be set according to the practical need, e.g., the image may have a pixel size of 256*256.

After the image with a pixel size of 256*256 has been inputted, as an input image, into the FCN, feature extraction may be performed on the input image by the FCN, so as to finally generate a feature map about the input image. The feature map may have a size smaller than the input image, e.g., it may be ⅛ of the size of the input image, i.e., it may have a pixel size of 32*32.

The feature extraction may be performed by the FCN using ResNet, e.g., ResNet50 or the like, or Feature Pyramid Networks (FPN), which will not be particularly defined herein.

Next, the feature map may pass through two convolutional branches, one of which is used for character recognition and the other of which is used for character positioning.

The convolutional branch for character recognition may recognize a character through determining a category of the character. To be specific, with respect to each position in the feature map, it may determine whether there is a character at a current position through determining a category of the character, and when there is any character, it may recognize the category of the character. The quantity of channels for determining the category of the character, e.g., 3000 or 6763, may be set for the convolutional branch in accordance with the practical needs.

Taking a commonly-used Chinese character set GB2312 as an example, 6763 channels may be set the convolutional branch. When the character recognition is performed through the convolutional branch, the character category information at the current position in the image may be determined in accordance with an excitation response from a channel of the convolutional branch.

For example, when there is an excitation response from a target channel in the 6763 channels for determining the character category, it may be determined that there is a character at the current position, and then the character category information about the character may be determined in accordance with a character category corresponding to the target channel. For example, when the target channel corresponds to a Chinese character "过" (meaning "crossing") and there is an excitation response from the target channel, it may be determined that the character at the current position is "过" (meaning "crossing").

For the convolutional branch for positioning a character, the information about the bounding box for the character may be determined through regression of the position of the center of the character. The quantity of channels for position regression may be set for the convolutional branch in accordance with the practical needs. For example, when the bounding box is of a square or rectangular shape, the quantity of channels may be set as four(4).

When the character positioning is performed using the convolutional branch with four(4) channels and there is a character at the current position, the regression to the current position may be performed. A coordinate offset between the current position and an upper left vertex of a bounding box corresponding to the character and a coordinate offset between the current position and a lower right vertex of the bounding box corresponding to the character may be predicted through the four channels, or a coordinate offset between the current position and an upper right vertex of the bounding box corresponding to the character and a coordinate offset between the current position and a lower left corner of the bounding box corresponding to the character may be predicted through the four channels.

A coordinate offset between the current position and one vertex of the bounding box corresponding to the character may be predicted on one dimension through each channel. The dimension may be a first dimension which is called as x dimension, or a second dimension which is called as y dimension.

In the case that there is a character at the current position, the information about the bounding box of the character may be determined in accordance with coordinate information about the current position and the four coordinate offsets acquired through prediction, and the geometrical information about the character may be determined accordingly.

For example, when the coordinate information about the current position is (10, 10), the coordinate offset between the current position and the upper left vertex of the bounding box of the character at the current position is (10, 10) and the coordinate offset between the current position and the upper right vertex of the bounding box of the character at the current position is (5, 5), the coordinate information about the upper left vertex of the bounding box may be (0, 20), the coordinate information about the upper right vertex may be (15, 5), and the width and the length of the bounding box may both be fifteen(15) respectively.

Finally, through the two convolutional branches in the FCN, it is able to recognize the character category information about the M characters, and acquire, through positioning, the character position information about the M characters.

It should be appreciated that, regardless of the FCN or a model using the target detection method, prior to the text recognition, usually training needs to be performed. To be specific, the FCN or the model using the target detection method may be trained through a large quantity of training images including the text information, and determining and marking out information about a position of a center of each character and information about a bounding box in the training image. After the training, the text recognition may be performed on the image through the FCN or the model using the target detection method.

Step S103: recognizing reading direction information about each character in accordance with the character information about the M characters, the reading direction information being used to indicate a next character corresponding to a current character in a semantic reading order.

In this step, the reading direction information refers to a next character corresponding to the current character in the semantic reading order. The semantic reading order refers to a reading order in accordance with text semantics. For example, when the text information includes "过桥米线" (i.e., a name of a kind of traditional Chinese noodle made of rice), an arrangement order of the four Chinese characters is just the semantic reading order of the text information. A Chinese character next to the Chinese character "过" (meaning "crossing") is "桥" (meaning "bridge"), so the reading direction information about the character may be the Chinese character "桥" (meaning "bridge").

The reading direction information about each character may be recognized by a reading order decoding module in accordance with the character information about the M characters in various ways. For example, the reading direction information about each character may be recognized using a Graph Neural Network in accordance with the character information about the M characters. For another example, the reading direction information about each character may be recognized using a text semantic recognition technology in accordance with the character information about the M characters.

A procedure of recognizing the reading direction information about each character in accordance with the character information about the M characters will be described hereinafter briefly taking the Graph Neural Network as an example. It should be appreciated that, the M characters may belong to a same image block or different image blocks.

When the M characters belong to a same image block, the reading direction information about each character may be recognized using the Graph Neural Network in accordance with the character information about the M characters. When the M characters belong to different image blocks, with respect to each target image block, the reading direction information about a target character in the target image block may be recognized using the Graph Neural Network in accordance with character information about the target character in the target image block, and finally the reading direction information about each of the M characters may be acquired. The target image block may be an image block including at least two characters.

A procedure of recognizing the reading direction information about each character using the Graph Neural Network in accordance with the character information about the M characters will be described hereinafter in more details when the M characters belong to a same image block.

To be specific, an input of the Graph Neural Network consists of two important pieces of information, i.e., nodes and edges. The node corresponds to characters in a two-dimensional space respectively. In actual use, the node may be represented by a specific data structure or data object. With respect to each character, a text recognition device may create a node corresponding to the character in the form of creating a data object in accordance with the character information about the character, and an attribute of the node corresponding to the character may include the character information about the character.

Correspondingly, subsequent to the creation of the node corresponding to the character, the data object representing the node may be acquired, and the data object of the node may be just node information about character.

The edge refers to a connection relation between nodes, or an incidence matrix consisting of connection relations between the nodes. For example, when a node i is connected to a node j, an edge may be formed between the two nodes, and in the case that there is an edge between the nodes, the connection relation may be represented by a numerical value "1". In the case that two nodes are not connected to each other, i.e., there is no edge between the two nodes, the connection relation may be represented by a numeral value "0".

With respect to each node, a connection relation between it and the other node may be set, so as to acquire edge connection information about the node. When setting the connection relation between a node and the other node, the node may be connected to all of M nodes corresponding to the M characters other than the node, i.e., there may exist edges between the node and any one of the other nodes.

With respect to each node, when setting the connection relation between a node and the other node, the node may also be connected to a part of the M nodes corresponding to the M characters other than the node, but not be connected to the other part of the M nodes. For example, when the M nodes include a node 1, a node 2, a node 3 and a node 4, the node 1 may be set to be connected to the node 2 and the node 3, but fail to be connected to the node 4.

In addition, a loop connection between a node and the node itself may also be set. When a node is connected to the node itself, there may exist the loop between the node and the node itself, and a connection relation may be represented by a numerical value "1", and when there is no loop, the connection relation may be represented by a numerical value "0".

Finally, with respect to each node, the edge connection information about the node may include M numerical values, and the edge connection information about all the nodes may be aggregated to form an M*M incidence matrix. An element at a position (i, j) in the incidence matrix may indicate whether the node i is connected to the node j. When a numerical value of the element is 1, it means that the node i is connected to the node j, and when the numerical value of the element is 0, it means that the node i is not connected to the node j.

The node information and the edge connection information acquired previously may be inputted into the Graph Neural Network, so as to predict a node direction, thereby to acquire direction information about each node. An output of the Graph Neutral Network is also an M*M target incidence matrix, and an element at a position (i, j) of the target incidence matrix may represent whether the node i points to the node j.

A relative position between the characters in the text information is fixed, and each character merely includes one ingoing edge and one outgoing edge. Hence, the element at the position (i, j) of the target incidence matrix may also represent whether a character next to a character corresponding to the node i in the semantic reading order is a character corresponding to the node j. When the element at this position has a numerical value "1", it means that the character next to the character corresponding to the node i in the semantic reading order is the character corresponding to the node j, and when the element at this position has a numerical value "0", it means that the character next to the character corresponding to the node i in the semantic reading order is not the character corresponding to the node j.

In addition, as for a first character and a last character in the text information, direction information about the corresponding nodes may be represented through loop connection, i.e., in the case that an element at a position, e.g., (5, 5) in the target incidence matrix has a numerical value "1", it means that there is a loop between a fifth node and the fifth node itself, and a character corresponding to this node is the first or last character.

Finally, the reading direction information about each character may be determined in accordance with the target incidence matrix outputted by the Graph Neural Network. For example, with respect to the first node, when an element at a position (1, 2) in the target incidence matrix has a numerical value "1", it means that the reading direction information about the character corresponding to the first node is a character corresponding to a second node. For another example, with respect to the second node, when an element at a position (2, 4) in the target incidence matrix has a numerical value "1", it means that the reading direction information about the character corresponding to the second node is a character corresponding to a fourth node.

It should be appreciated that, in order to enable the Graph Neural Network to have a capability of recognizing the reading direction information about each character, it is necessary to restrain and guide the Graph Neural Network in accordance with a large quantity of training text information and label information about the reading direction of the characters in the training text information, i.e., it is necessary to train the Graph Neural Network when using it.

Step S104: ranking the M characters in accordance with the reading direction information about the M characters to acquire a text recognition result of the text information.

In this step, the M characters may be ranked in accordance with the reading direction information about the M characters, so as to finally acquire the text recognition result of the text information.

Figure 2:
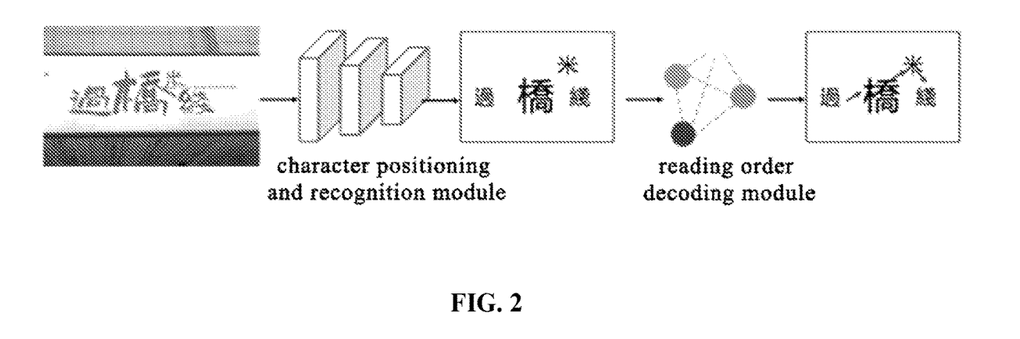
FIG. 2 is a schematic view showing a specific implementation of the text recognition method.

FIG. 2 shows a specific implementation of the text recognition method. As shown in FIG. 2, an acquired image includes text information "过桥米线" (i.e., a name of a kind of traditional Chinese noodle made of rice). Some artistic designs have been introduced into the text information about the image, so that the Chinese characters cannot be read in an order from left to right and from top to down directly.

The image may be inputted to the character positioning and recognition module, and the text recognition may be performed on the image by the character positioning and recognition module to acquire character information about the four Chinese characters. The character information may include character category information and character position information. Based on the character position information in an order from top to down and from left to right, a first Chinese character is "米" (meaning "rice"), a second Chinese character is "过" (meaning "crossing"), a third Chinese character is "桥" (meaning "bridge") and a fourth Chinese character is "线" (meaning "thread"), i.e., an output result may be "米过桥线" (which fails to constitute a meaningful name any more). At this time, a semantic error may occur.

In this application scenario, as shown in FIG. 2, the reading direction information about each character may be recognized by the reading order decoding module. For example, the first Chinese character "米" (meaning "rice") points to the fourth Chinese character "线" (meaning "thread"), the second Chinese character "过" (meaning "crossing") points to the third Chinese character "桥" (meaning "bridge"), the third Chinese character "桥" (meaning "bridge") points to the first Chinese character "米" (meaning "rice"), and the fourth Chinese character points to the character itself. The four Chinese characters may be ranked in accordance with the reading direction information about each character, so as to determine the text recognition result of the text information as "过桥米线" (i.e., a name of a kind of traditional Chinese noodle made of rice).

In this embodiment of the present disclosure, the text recognition may be performed on the image to acquire the character information about the M characters, the reading direction information about each character may be recognized in accordance with the character information about the M characters, and then the M characters may be ranked in accordance with the reading direction information about the M characters to acquire the text recognition result of the text information. In this regard, no matter whether the text information in the image is a regular text or an irregular text, it is able to acquire the text recognition result conforming to the semantics, thereby to improve a recognition effect of the text in the image.

In a possible embodiment of the present disclosure, the character information may include character position information. Prior to Step S104, the text recognition method may further include dividing the image into at least two image blocks in accordance with the character position information about the M characters, and the at least two image blocks may include the M characters. Step S104 may specifically include determining reading direction information about a target character in a target image block in accordance with character information about the target character in the target image block, and the target image block may be an image block including at least two characters in the at least two image blocks.

During the implementation, whether the M characters belong to a same image block may be determined in accordance with the character position information about the M characters. When the M characters belong to different image blocks, the image may be divided into at least two image blocks in accordance with the character position information about the M characters. As a division principle, the image may be divided into blocks in accordance with a distance between nodes, i.e., the nodes at a large distance from each other may be separated into different image blocks, and the nodes at a small distance from each other may be aggregated in a same image block.

To be specific, the distance between two characters may be determined in accordance with the character position information about the M characters. The nodes at a distance smaller than a first predetermined threshold may be aggregated, and the nodes at a distance greater than a second predetermined threshold may be spaced apart from each other, so as to acquire at least two image blocks. Each image block may include at least one character.

After the M characters have been spaced apart from each other with respect to different image blocks, in the case that the image includes at least two target image blocks, with respect to each target image block, reading direction information about a target character in the target image block may be determined in accordance with character information about the target character in the target image block, so as to acquire the reading direction information about each character. The target image block may be an image block including at least two characters in the at least two image blocks. In addition, in the case that the image block merely includes one character, the reading direction information about the character may point to the character itself by default, or the reading direction information about the character may be zero(0).

In this embodiment of the present disclosure, the image may be divided into at least two image blocks in accordance with the character position information about the M characters, and the reading direction information about the target character in the target image block may be determined in accordance with the character information about the target character in the target image block. Hence, the reading direction information about the characters may be recognized on a basis of the target image block, and then the text recognition result of the text information in the image may be determined in accordance with the recognized reading direction information about the M characters. As a result, it is able to improve the accuracy of the text semantic recognition, thereby to further improve the text recognition effect.

In a possible embodiment of the present disclosure, the determining the reading direction information about the target character in the target image block in accordance with the character information about the target character in the target image block may include: creating a node corresponding to each target character in the target image block, and acquiring node information about each target character, the node information including the character information; acquiring edge connection information about each node, the edge connection information representing a connection relation between the nodes; and determining the reading direction information about the target character in the target image block in accordance with the acquired node information and the acquired edge connection information.

During the implementation, a way for the creation of the node corresponding to each target character in the target image block may be similar to the way for the creation of the node corresponding to each character mentioned hereinabove. The way for the creation of the node corresponding to each character is applied to a scenario where the M characters belong to a same image block, and during the creation, the node corresponding to each character in the M characters may be created. However, in this embodiment of the present disclosure, the way for the creation of the node is applied to a scenario where the M characters belong to different image blocks, and during the creation, the node corresponding to each target character in the target image block may be created with respect to each target image block. Correspondingly, the node information about a node corresponding to each target character may be acquired.

After the creation of the node corresponding to each target character, the edge connection information about each node may be acquired. In this embodiment of the present disclosure, the edge connection information may represent a connection relation between the nodes corresponding to the target characters in the target image blocks.

Next, the reading direction information about each target character may be recognized by the reading order decoding module in accordance with the acquired node information and the acquired edge connection information. A recognition mode of the reading order decoding module may be the Graph Neural Network, a text semantic recognition technology or the others, which will not be particularly defined herein.

In this embodiment of the present disclosure, the node corresponding to each target character in the target image block may be created, and the node information about each target character and including the character information may be acquired, and then the edge connection information about each node and representing the connection relation between the nodes may be acquired. As a result, it is able to determine the reading direction information about the target character in the target image block in accordance with the acquired node information and the acquired edge connection information, thereby to recognize the text information in the semantic reading order.

In a possible embodiment of the present disclosure, the determining the reading direction information about the target character in the target image block in accordance with the acquired node information and the acquired edge connection information may include inputting the acquired node information and the acquired edge connection information into the Graph Neural Network to predict the reading direction information, thereby to determine the reading direction information about the target character in the target image block. The Graph Neural Network may be a Graph Neutral Network with an existing structure or a new structure, which will not be particularly defined herein.

Taking the Graph Neural Network with the existing structure as an example, to be specific, it may include a plurality of Graph Neural Network layers, and each Graph Neural Network layer may be any of common Graph Neural Network layers. After the acquired node information and the acquired edge connection information have been inputted into the Graph Neural Network, the plurality of Graph Neural Network layers may be stacked one on another to perform fusion and inference on the information. Next, an incidence matrix at a last layer of the Graph Neural Network may be restrained and guided during the training, so as to finally output a target incidence matrix representing the reading direction information about each target character.

During the implementation, the characters may be arranged in various modes in a two-dimensional space, and distances between the characters may be different. Accordingly with respect to each target image block, the reading direction information about the target character in the target image may be recognized using an advanced Graph Neural Network in accordance with the node information about the node corresponding to the target character in the target image block and the edge connection information, so as to recognize the text in the target image block in the semantic reading order.

In a possible embodiment of the present disclosure, the created nodes may include a first target node, and the first target node may be any of the created nodes. The acquiring the edge connection information about each node may include: determining a second target node corresponding to the first target node in the created nodes in accordance with the character position information about the target character in the target image block, a distance between the second target node and the first target node being smaller than a distance between a node of the created nodes other than the second target node and the first target node; and creating a first connection relation between the first target node and the second target node, and creating a second connection relation between the first target node and the node of the created nodes other than the second target node, to acquire edge connection information about the first target node. The first connection relation may represent that the two nodes are connected to each other, and the second connection relation may represent that the two nodes are not connected to each other.

In a default case, usually there is no semantic relation between the characters at a large distance from each other, so in this embodiment of the present disclosure, when creating the connection relation between the nodes, the distance between the nodes may be taken into consideration, and the connection relation between the nodes may be processed using a k-Nearest Neighbor algorithm Taking a 5-Nearest Neighbor algorithm as an example, with respect to each node, the node may be connected to five(5) nodes nearest to the node, but it may not be connected to the other nodes.

To be specific, with respect to any of the created node, i.e., the first target node, a distance between the first target node and the other node may be determined in accordance with the character position information about the target character in the target image block, and then the second target node corresponding to the first target node in the created nodes may be determined using a Nearest Neighbor algorithm in accordance with the determined distance.

Next, the first connection relation between the first target node and the second target node and the second connection relation between the first target node and the node of the created nodes other than the second target node and the first target node may be created. In addition, a first connection relation between the first target node and itself may be further created, so as to finally acquire the edge connection information about the first target node.

In this embodiment of the present disclosure, the second target node corresponding to the first target node in the created nodes may be determined in accordance with the character position information about the target character in the target image block, and then the first connection relation between the first target node and the second target node and the second connection relation between the first target node and the node of the created nodes other than the second target node and the first target node may be created. As a result, it is able to reduce the quantity of edges between the nodes, thereby to reduce a processing difficulty of the Graph Neural Network after the information has been inputted into the Graph Neural Network.

Second Embodiment

Figure 3:
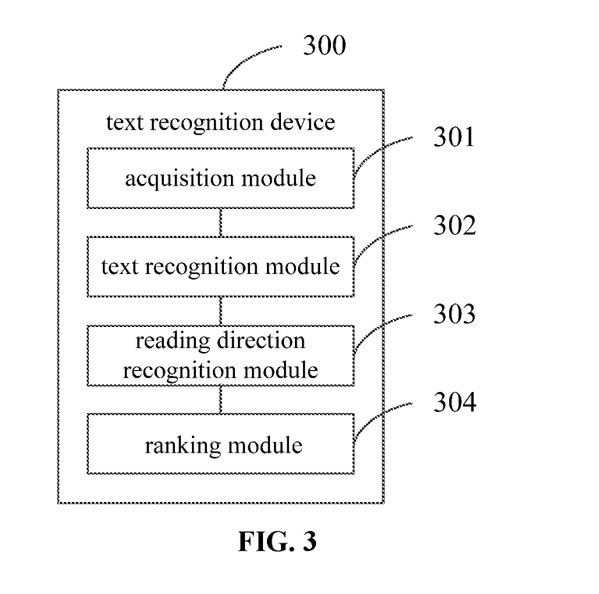
FIG. 3 is a schematic view showing a text recognition device according to a second embodiment of the present disclosure.

As shown in FIG. 3, the present disclosure provides in this embodiment a text recognition device 300, which includes: an acquisition module 301 configured to acquire an image including text information, the text information including M characters, M being a positive integer greater than 1; a text recognition module 302 configured to perform text recognition on the image to acquire character information about the M characters; a reading direction recognition module 303 configured to recognize reading direction information about each character in accordance with the character information about the M characters, the reading direction information being used to indicate a next character corresponding to a current character in a semantic reading order; and a ranking module 304 configured to rank the M characters in accordance with the reading direction information about the M characters to acquire a text recognition result of the text information.

In a possible embodiment of the present disclosure, the character information may include character position information. The text recognition device may further include a division module configured to divide the image into at least two image blocks in accordance with the character position information about the M characters, and the at least two image blocks may include the M characters. The reading direction recognition module 303 is specifically configured to determine the reading direction information about a target character in a target image block in accordance with character information about the target character in the target image block, and the target image block may be an image block including at least two characters in the at least two image blocks.

In a possible embodiment of the present disclosure, the reading direction recognition module 303 may include: a creation unit configured to create a node corresponding to each target character in the target image block; a first acquisition unit configured to acquire node information about each target character, and the node information including the character information; a second acquisition unit configured to acquire edge connection information about each node, the edge connection information representing a connection relation between the nodes; and a determination unit configured to determine the reading direction information about the target character in the target image block in accordance with the acquired node information and the acquired edge connection information.

In a possible embodiment of the present disclosure, the determination unit is specifically configured to input the acquired node information and the acquired edge connection information into a Graph Neural Network for predicting the reading direction information, to determine the reading direction information about the target character in the target image block.

In a possible embodiment of the present disclosure, the created nodes may include a first target node. The acquisition unit is specifically configured to: determine a second target node corresponding to the first target node in the created nodes in accordance with the character position information about the target character in the target image block, a distance between the second target node and the first target node being smaller than a distance between a node in the created nodes other than the second target node and the first target node; and create a first connection relation between the first target node and the second target node, and a second connection relation between the first target node and the node in the created nodes other than the second target node, to acquire edge connection information about the first target node. The first connection relation may represent that the two nodes are connected to each other, and the second connection relation may represent that the two nodes are not connected to each other.

In this embodiment of the present disclosure, the text recognition device 300 may be used to implement the steps of the above-mentioned text recognition method with a same beneficial effect, which will not be particularly defined herein.

The present disclosure further provides in some embodiments an electronic device, a computer-readable storage medium and a computer program product.

Figure 4:
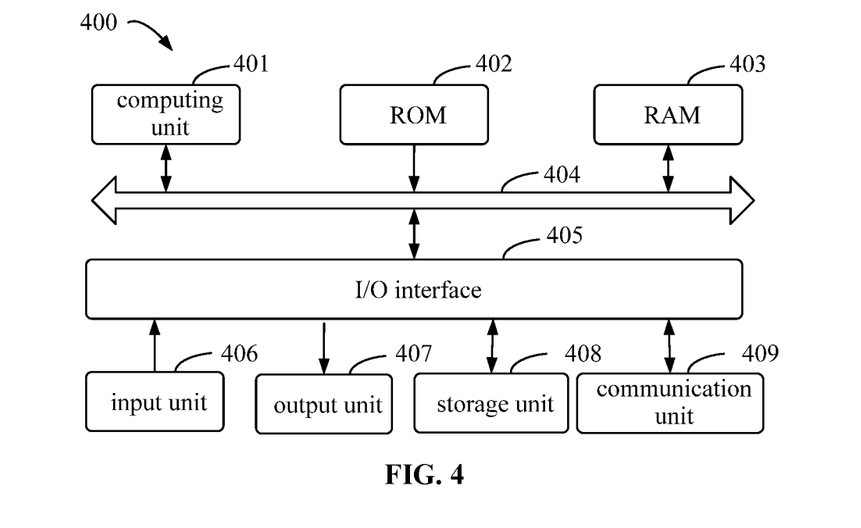
FIG. 4 is a block diagram of an electronic device 400 for implementing the method according to one embodiment of the present disclosure.

FIG. 4 is a schematic block diagram of an exemplary electronic device 400 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a Personal Digital Assistant (PDA), a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 4, the electronic device 400 includes a computing unit 401 configured to execute various processings in accordance with computer programs stored in a Read Only Memory (ROM) 402 or computer programs loaded into a Random Access Memory 403 via a storage unit 408. Various programs and data desired for the operation of the electronic device 400 may also be stored in the RAM 403. The computing unit 401, the ROM 402 and the RAM 403 may be connected to each other via a bus 404. In addition, an input/output (I/O) interface 405 may also be connected to the bus 404.

Multiple components in the electronic device 400 are connected to the I/O interface 405. The multiple components include: an input unit 406, e.g., a keyboard, a mouse and the like; an output unit 407, e.g., a variety of displays, loudspeakers, and the like; a storage unit 408, e.g., a magnetic disk, an optic disk and the like; and a communication unit 409, e.g., a network card, a modem, a wireless transceiver, and the like. The communication unit 409 allows the electronic device 400 to exchange information/data with other devices through a computer network and/or other telecommunication networks, such as the Internet.

The computing unit 401 may be any general purpose and/or special purpose processing components having a processing and computing capability. Some examples of the computing unit 401 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 401 carries out the aforementioned methods and processes, e.g., the text recognition method. For example, in some embodiments of the present disclosure, the text recognition method may be implemented as a computer software program tangibly embodied in a machine readable medium such as the storage unit 408. In some embodiments of the present disclosure, all or a part of the computer program may be loaded and/or installed on the electronic device 400 through the ROM 402 and/or the communication unit 409. When the computer program is loaded into the RAM 403 and executed by the computing unit 401, one or more steps of the foregoing text recognition method may be implemented. Optionally, in some other embodiments of the present disclosure, the computing unit 401 may be configured in any other suitable manner (e.g., by means of firmware) to implement the text recognition method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD)

monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN), an Internet, and a blockchain network.

The computer system can include a client and a server. The client and server are generally remote from each other and typically interact through a communication network. The relationship of client and server arises by virtue of computer programs running on respective computers and having a client-server relationship to each other. The server may be a cloud server, also called as cloud computing server or cloud server, which is a host product in a cloud calculating service system, so as to overcome such defects as large management difficulty and insufficient service extensibility in a conventional physical host and a Virtual Private Server (VPS). The server may also be a server of a distributed system, or a server combined with blockchain.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A text recognition method, which is applied to an electronic device, the text recognition method comprising:
    acquiring an image comprising text information, the text information comprising M characters, M being a positive integer greater than 1;
    performing text recognition on the image to acquire character information about the M characters;
    recognizing reading direction information about each character in accordance with the character information about the M characters by using a Graph Neural Network, the reading direction information being used to indicate a next character corresponding to a current character in a semantic reading order, wherein the semantic reading order refers to a reading order in accordance with text semantics; and
    ranking the M characters in accordance with the reading direction information about the M characters to acquire a text recognition result of the text information,
    wherein the character information comprises character positon information, wherein prior to recognizing the reading direction information about each character in accordance with the character information about the M characters, the text recognition method further comprises:
    dividing the image into at least two image blocks in accordance with the character position information about the M character, and the at least two image blocks comprise the M characters,
    wherein the recognizing the reading direction information about each character in accordance with the character information about the M characters comprises:
    determining the reading direction information about a target character in a target image block in accordance with character information about the target character in the target image block, and the target image block is an image block comprising at least two characters in the at least two image block,
    wherein the determining the reading direction information about the target character in the target image block in accordance with the character information about the target character in the target image block comprises:
    creating a node corresponding to each target character in the target image block, and acquiring node information about each target character, wherein the node information comprises the character information;
    acquiring edge connection information about each node, the edge connection information representing a connection relation between the nodes; and
    determining the reading direction information about the target character in the target image block in accordance with the acquired node information and the acquired edge connection information.

2. The text recognition method according to claim 1, wherein the determining the reading direction information about the target character in the target image block in accordance with the acquired node information and the acquired edge connection information comprises:
    inputting the acquired node information and the acquired edge connection information into the Graph Neural Network for predicting the reading direction information, to determine the reading direction information about the target character in the target image block.

3. The text recognition method according to claim 1, wherein the created nodes comprise a first target node, wherein acquiring the edge connection information about each node comprises:
    determining a second target node corresponding to the first target node in the created nodes in accordance with the character position information about the target character in the target image block, a distance between the second target node and the first target node being smaller than a distance between a node in the created nodes other than the second target node and the first target node; and
    creating a first connection relation between the first target node and the second target node, and a second connection relation between the first target node and the node in the created nodes other than the second target node, to acquire edge connection information about the first target node, wherein the first connection relation represents that the two nodes are connected to each other, and the second connection relation represents that the two nodes are not connected to each other.

4. The text recognition method according to claim 1, wherein the image comprises an image collected in real time, or a pre-stored image, or an image from the other device, or an image acquired from a network.

5. The text recognition method according to claim 4, wherein the image comprises an image of a shop sign, or an image of a shop in a mall, or an image of a traffic sign.

6. An electronic device, comprising at least one processor and a memory in communication with the at least one processor, wherein the memory is configured to store therein an instruction executed by the at least one processor, and the at least one processor is configured to enable the electronic device to execute the instruction so as to implement a text recognition method, comprising:
  acquiring an image comprising text information, the text information comprising M characters, M being a positive integer greater than 1;
  performing text recognition on the image to acquire character information about the M characters;
  recognizing reading direction information about each character in accordance with the character information about the M characters by using a Graph Neural Network, the reading direction information being used to indicate a next character corresponding to a current character in a semantic reading order, wherein the semantic reading order refers to a reading order in accordance with text semantics; and
  ranking the M characters in accordance with the reading direction information about the M characters to acquire a text recognition result of the text information,
  wherein the character information comprises character position information, wherein prior to recognizing the reading direction information about each character in accordance with the character information about the M characters, the text recognition method further comprises:
  dividing the image into at least two image blocks in accordance with the character position information about the M characters, and the at least two image blocks comprise the M character,
  wherein the recognizing the reading direction information about each character in accordance with the character information about the M characters comprises:
  determining the reading direction information about a target character in a target image block-in accordance with character information about the target character in the target image block, and the target image block is an image block comprising at least two characters in the at least two image blocks,
  wherein the determining the reading direction information about the target character in the target image block in accordance with the character information about the target character in the target image block comprises:
  creating a node corresponding to each target character in the target image block, and acquiring node information about each target character, wherein the node information comprises the character information;
  acquiring edge connection information about each node, the edge connection information representing a connection relation between the nodes, and
  determining the reading direction information about the target character in the target image block in accordance with the acquired node information and the acquired edge connection information.

7. The electronic device according to claim 6, wherein the determining the reading direction information about the target character in the target image block in accordance with the acquired node information and the acquired edge connection information comprises:
  inputting the acquired node information and the acquired edge connection information into the Graph Neural Network for predicting the reading direction information, to determine the reading direction information about the target character in the target image block.

8. The electronic device according to claim 6, wherein the created nodes comprise a first target node, wherein acquiring the edge connection information about each node comprises:
  determining a second target node corresponding to the first target node in the created nodes in accordance with the character position information about the target character in the target image block, a distance between the second target node and the first target node being smaller than a distance between a node in the created nodes other than the second target node and the first target node; and
  creating a first connection relation between the first target node and the second target node, and a second connection relation between the first target node and the node in the created nodes other than the second target node, to acquire edge connection information about the first target node,
  wherein the first connection relation represents that the two nodes are connected to each other, and the second connection relation represents that the two nodes are not connected to each other.

9. The electronic device according to claim 6, wherein the image comprises an image collected in real time, or a pre-stored image, or an image from the other device, or an image acquired from a network.

10. The electronic device according to claim 9, wherein the image comprises an image of a shop sign, or an image of a shop in a mall, or an image of a traffic sign.

11. A non-transitory computer-readable storage medium storing therein a computer instruction, wherein the computer instruction is executed by a computer so as to implement a text recognition method, comprising:
  acquiring an image comprising text information, the text information comprising M characters, M being a positive integer greater than 1;
  performing text recognition on the image to acquire character information about the M characters;
  recognizing reading direction information about each character in accordance with the character information about the M characters by using a Graph Neural Network, the reading direction information being used to indicate a next character corresponding to a current character in a semantic reading order, wherein the semantic reading order refers to a reading order in accordance with text semantics; and
  ranking the M characters in accordance with the reading direction information about the M characters to acquire a text recognition result of the text information,
  wherein the character information comprises character position information, wherein prior to recognizing the reading direction information about each character in accordance with the character information about the M characters, the text recognition method further comprises:

dividing the image into at least two image blocks in accordance with the character position information about the M characters, and the at least two image blocks comprise the M characters, wherein the recognizing the reading direction information about each character in accordance with the character information about the M character comprises:

determining the reading direction information about a target character in a target image block in accordance with character information about the target character in the target image block, and the target image block is an image block comprising at least two characters in the at least two image blocks, wherein the determining the reading direction information about the target character in the target image block in accordance with the character information about the target character in the target image block comprise:

creating a node corresponding to each target character in the target image block, and acquiring node information about each target character, wherein the node information comprises the character information;

acquiring edge connection information about each node, the edge connection information representing a connection relation between the nodes; and determining the reading direction information about the target character in the target image block in accordance with the acquired node information and the acquired edge connection information.

12. The non-transitory computer-readable storage medium according to claim 11, wherein the determining the reading direction information about the target character in the target image block in accordance with the acquired node information and the acquired edge connection information comprises:

inputting the acquired node information and the acquired edge connection information into the Graph Neural Network for predicting the reading direction information, to determine the reading direction information about the target character in the target image block.

13. The non-transitory computer-readable storage medium according to claim 11, wherein the created nodes comprise a first target node, wherein acquiring the edge connection information about each node comprises:

determining a second target node corresponding to the first target node in the created nodes in accordance with the character position information about the target character in the target image block, a distance between the second target node and the first target node being smaller than a distance between a node in the created nodes other than the second target node and the first target node; and creating a first connection relation between the first target node and the second target node, and a second connection relation between the first target node and the node in the created nodes other than the second target node, to acquire edge connection information about the first target node, wherein the first connection relation represents that the two nodes are connected to each other, and the second connection relation represents that the two nodes are not connected to each other.

14. The non-transitory computer-readable storage medium according to claim 11, wherein the image comprises an image collected in real time, or a pre-stored image, or an image from the other device, or an image acquired from a network; and wherein the image comprises an image of a shop sign, or an image of a shop in a mall, or an image of a traffic sign.

* * * * *